Patented Sept. 21, 1948

2,449,949

UNITED STATES PATENT OFFICE 2,449,949

HYDROGENATED LINEAR POLYMERS AND COPOLYMERS OF BRANCH-CHAIN HEXADIENES

Rupert C. Morris and John L. Van Winkle, Berkeley, Calif., assignors to Shell Development Company, San Francisco, Calif., a corporation of Delaware No Drawing. Application September 4, 1944, Serial No. 552,712

4 Claims. (Cl. 260—74)

This invention relates to hydrogenated diene polymers.

In the production of transparent laminates such as safety glass it is apparently necessary to employ as an interlayer a plastic substance of relatively high molecular weight. To be satisfactory the substance must be capable of being adhered tenaciously to the glass or other base over a wide temperature range. Further, it must have satisfactory strength, must be substantially colorless and must be free from any tendency to discolor in use.

Polyvinyl butyral resins, which are commonly used as safety glass interlayers, are satisfactory in many respects, but are relatively expensive. Among the many less expensive substitutes which have been suggested are hydrogenated natural and synthetic rubbers. However, most of these cannot be obtained in colorless condition. Others do not exhibit the required adhesion at low temperatures. Many hydrogenated rubbers undergo decomposition and degradation when subjected to rigorous weathering.

We have now discovered the hydrogenated polymeric methylpentadienes and have found that compositions satisfactory as interlayer material for transparent laminates can be produced therefrom. The hydrogenated polymers can be obtained as colorless stable substances of high tensile and impact strength, capable of adhering to many kinds of transparent base material over a wide range of temperature. This new high molecular weight material makes possible the production of laminates at a fraction of the cost of polyvinyl butyral laminates. The material is not, however, limited to this use.

The polymeric methylpentadienes with which the invention is concerned may be obtained by the polymerization of branch-chain 1,3-hexadienes having a straight chain of 5 carbon atoms, specifically, 2-methyl-1,3-pentadiene, 3-methyl-1,3-pentadiene and 4-methyl-1,3-pentadiene. A single methylpentadiene may be polymerized alone; or two or more methylpentadienes may be polymerized together. It is preferred to employ a mixture of 2-methyl-1,3-pentadiene and 4-methyl-1,3-pentadiene, e. g. a mixture of about 85% of the former with about 15% of the latter such as may be obtained by the dehydration of 2-methyl-2,4-pentanediol. If desired, one or more methylpentadienes may be copolymerized with one or more other polymerizable unsaturated compounds such as styrene, alpha-methyl styrene, dichlorostyrene, acrylonitrile, methacrylonitrile, acrylic acid, methyl acrylate, methyl methacrylate, methyl vinyl ketone, acrolein, methacrolein, 1,3-butadiene, isoprene, piperylene, etc. However, preferred polymers are those consisting of the methylpentadienes alone, or, less desirably, of the methylpentadienes copolymerized with not more than about 25% by weight (of the total) of one or more other unsaturated compounds.

Polymerization may be effected in any suitable manner. Polymerization in aqueous emulsion with persulfates, perborates, peroxides or other "per" compounds is satisfactory, although the rate and yields are low. Higher yields and faster polymerization can be obtained by polymerization with diazoaminoaryl compounds such as diazoaminobenzene as catalysts at temperatures above about 75° C., preferably about 90° C. Polymers so produced may be slightly discolored, but can be decolorized by sufficient washing.

Polymerization in the presence of a Friedel-Crafts catalyst is particularly desirable for the purposes of the present invention, since in this way color-stable polymers are readily obtained. Friedel-Crafts catalysts which may be employed include boron trifluoride and hydrolyzable metallic halides such as stannic chloride, zinc chloride, ferric chloride, titanium tetrachloride, aluminum chloride, antimony pentachloride, etc. Other Friedel-Crafts catalysts are described by Calloway in Chem. Rev. 17, 327 (1925). Stannic chloride is liquid and is readily soluble in the methylpentadienes, even at low temperatures. For this and other reasons stannic chloride is the preferred catalyst. The metallic halides are preferably added to the methylpentadienes in solution in an inert liquid such as methyl chloride, ethyl chloride and 2,4-dimethyl sulfolane. Amounts of catalysts from about 0.2 to about 10 parts per 100 parts of polymerizable unsaturated compounds have been found satisfactory, although smaller or larger amounts may be used. Polymerization in the presence of Friedel-Crafts catalysts should be carried out under substantially anhydrous conditions.

With Friedel-Crafts catalysts the methylpentadienes may be polymerized in bulk in the absence of diluents. Ordinarily, however, the reaction proceeds more smoothly and products of improved homogeneity are obtained if a homogenizing agent is present. Preferred homogenizing agents are liquids which are solvents for both monomer and polymer under the conditions involved. Non-aromatic hydrocarbon and non-aromatic halogenated hydrocarbon liquids are suitable. Saturated and unsaturated solvents may be used.

Examples of suitable solvents are ethane, propane, the butanes, the pentanes, etc.; ethylene, propylene, the butylenes, the pentylenes, etc.; butadiene, isoprene, etc.; methyl chloride, ethyl chloride, propyl chloride, etc. The olefins and diolefins named do not appear appreciably to polymerize with stannic chloride as a catalyst at low temperatures, although in favorable cases a small amount of polymerization and/or interpolymerization with the methylpentadienes may occur. Many other substances are suitable as homogenizing agents. Ethers, alcohols and esters may be undesirable, if they form complexes with the metallic halides involved. The amount of homogenizing agent used may be varied over a wide range, e. g. from about 10 parts to about 10,000 parts of homogenizing agent per 100 parts of the polymerizable unsaturated compounds employed, although the more narrow range of from about 70 parts to about 30 parts per 100 parts of the polymerizable compounds is preferred.

In the Friedel-Crafts polymerization of the methylpentadienes temperatures of below about −50° C. result in rubbery products characterized by an elastic limit. Lower temperatures, e. g. −75° C. to −200° C. and even lower, may be employed. At more elevated temperatures the products have non-rubbery characteristics. Temperatures as high as room temperature and above produce useful polymers. Temperatures up to about 100° C. have been employed. The temperature of the polymerization reaction mixture is preferably held substantially constant throughout the reaction. Wide variations result in inhomogeneous products.

The methylpentadiene polymers produced by any of the suitable methods are high molecular weight linear compounds. The hydrogenated products of polymers having molecular weights of at least about 8,000 may be used in safety glass interlayers. Polymers having molecular weights of about 8,000 may be obtained by Friedel-Crafts polymerization at about 0° C. Polymers having a molecular weight of 50,000 such as may be produced by Friedel-Crafts polymerization at about −50° C., and polymers having higher molecular weights are rubbery. The hydrogenation products of these rubbery polymers are preferred for use in safety glass interlayer compositions. Some of the polymers have a molecular weight as high as 500,000 and more. The hydrogenation products of lower molecular weight polymers are useful for other purposes, more fully described hereinafter.

If desired, the polymers may be isolated and purified in any suitable manner.

Hydrogenation may be effected by substantially any known or special methods. Hydrogenation can be accomplished upon polymer which has been separated from the reaction mixture and purified or upon crude polymer which has not been isolated or which has been only partially isolated from the other ingredients of the reaction mixture.

The hydrogenation of the poly-methylpentadienes may be effected by catalytic or electrolytic methods or, in special cases, by chemical reduction. Where electrolytic methods are used a solution of the material in a solvent conductive to hydrolysis is subjected to the action of a direct current flowing between suitable electrodes such as a platinum gauze anode and a revolving silver cathode. The anode is preferably enclosed in a porous container in accordance with well known practice. Substantially any non-reactive organic solvent stable under the conditions involved may be used. Non-solvent diluents may be present. A strong electrolyte should be present to serve as a conductor. Substantially any source of direct current may be used. Currents as low as about 0.1 ampere or as high as about 1 ampere are suitable, although higher or lower currents are satisfactory.

In catalytic hydrogenation a small amount of a hydrogenation catalyst may be suspended in a solution of the material to be hydrogenated and the mixture subjected to the action of molecular or nascent hydrogen, usually the former, under heat and pressure. Substantially any non-reactive organic solvent stable under the conditions employed may be used. Mixtures of solvents may be used. Non-solvent diluents may be present. The ratio of solvent to polymer may be varied over a wide range. A suitable ratio is 3 parts of solvent to 1 part of polymer, although larger ratios, e. g. as high as 100 parts of solvent per part of polymer or smaller ratios, e. g. as low as 0.1 part of solvent per part of polymer, may be used in most cases. With liquid polymers and with polymers which become fluid under the hydrogenation conditions employed it may be unnecessary to use any solvent at all.

Among the suitable hydrogenation catalysts are oxides or sulfides of the metals, particularly the oxides or sulfides of nickel, tungsten, molybdenum, cerium, thorium, chromium and zirconium or mixtures comprising two or more metal oxides and/or sulfides, or one or more metal oxides with one or more metals. Compound catalysts comprising two or more metals in admixture or alloyed as, for example, silver-copper, copper-chromium, copper-zinc, nickel-cobalt, nickel-zinc, etc., have been found useful.

Excellent results may be obtained by using suitable metal catalysts which are reasonably inexpensive and easy to prepare and regenerate. For example, base metal catalysts such as copper, chromium, thallium, nickel, iron, cobalt and the like are particularly effective when employed in a finely divided state or deposited on a suitable carrier. Pyrophoric nickel, iron and cobalt are especially suitable for use in effecting the process of this invention, for they possess the proper initial activity for rapid hydrogenation at relatively low temperatures and pressures, are easily prepared and regenerated, and retain their activity over relatively long periods of time. Particularly fine results have been noted with the use of a finely divided pyrophoric metal catalyst such as Raney nickel catalyst. These catalysts may be used singly or in combination, and may, if desired, be deposited upon an inert substance or carrier such as pumice, silica gel, kieselguhr, charcoal, calcium carbonate, and the like. The activity of the catalyst may also be enhanced by the incorporation of promoters, which include such substances as high melting and difficultly reducible oxygen-containing compounds, in particular the oxides and oxygen-containing salts of elements such as the alkaline earth and rare earth metals, beryllium, magnesium, aluminum, copper, thorium, manganese, uranium, vanadium, chromium, boron, zinc, etc. A particularly suitable group of promoters includes the difficultly soluble phosphates, molybdates, tungstates and selenates of the above-listed metals, or their oxygen-containing reduction products, as for example the corresponding selenites.

Although the base metal catalysts are most suitable, it is to be understood that the noble metals of the requisite activity selected from the group comprising gold, silver, platinum, palladium, osmium, rhodium, iridium and the like may also be used, severally or in combination, or in admixture with one or more of the base metals.

These catalysts may be prepared by any suitable method. A pyrophoric nickel catalyst of great activity may be prepared by effecting the reduction or thermal decomposition of nickel salts of volatile organic acids. For example, a pyrophoric nickel catalyst particularly suitable in the execution of this invention may be prepared by effecting the reduction or decomposition of nickelous formate. The nickelous formate may be reduced to pyrophoric nickel metal by heating it to a temperature of from about 200° C. to 350° C. in an atmosphere of hydrogen, or the nickelous formate may be dissolved or suspended in a suitable inert liquid such as a petroleum oil, hydrocarbon and the like and the mixture heated to the decomposition temperature of the nickelous formate in the presence or absence of hydrogen or other suitable reducing gases.

The amount of the catalyst to be used will depend to some extent upon the particular compound to be reacted with hydrogen and upon the activity of the specific catalyst selected. When Raney nickel is used, the catalyst is generally present in an amount equal to about 1% to about 20% by weight of the organic reactants in the reaction mixture. However, considerable variation in this proportion may be made.

From about 5 parts to about 75 parts of hydrogenation catalyst to 100 parts of polymethylpentadiene have been used with good results, the more narrow range of about 10 to about 40 parts of catalyst per 100 parts of polymer being preferred. The catalyst is usually added directly to the solution of polymer and suspended therein by agitation. In some cases agitation is unnecessary.

The usual procedure is to place the mixture of polymer, solvent and catalyst in a suitable vessel to sweep out atmospheric gases with hydrogen and subsequently to force hydrogen into the vessel under pressure. Relatively low pressures, e. g. 500 to 1,000 p. s. i., are effective. Higher pressures are correspondingly more effective. A pressure of about 1,500 p. s. i. is convenient. Pressures as high as 2,000 to 3,000 p. s. i. can be used. Hydrogen is consumed in the reaction. Where the vessel is not continuously connected with a source of hydrogen under pressure it may be desirable to make one or more additions of hydrogen during the reaction. Ordinarily, however, such additions are not required. Temperatures of from about 50° C. to about 350° C. may be used. However, it has been found that, particularly with the desirable high molecular weight polymers, considerable degradation occurs in the higher temperature range. As a consequence it is preferred to use relatively low temperatures, e. g. from about 50° C. to about 150° C. Less degradation occurs in the production of products having a given content of added hydrogen, if the temperature is increased gradually during the reaction to the desired maximum.

The hydrogenation may be effected in a continuous or batchwise manner. While usually unnecessary, the polymer may be subjected to a second hydrogenation, if desired, using fresh catalyst.

Following hydrogenation, the catalyst may be removed by filtering and the hydrogenated polymer separated from the solvent, if any, by precipitation, fractional distillation, evaporation or the like.

It is theoretically possible to add two atoms of hydrogen per diene unit in the polymer, i. e. per molecule of monomeric diene entering into the polymer. In the case of polymers produced solely from the methylpentadienes this product would contain approximately 2.4% of added hydrogen. In practice this theoretic maximum is almost never achieved, probably because the unhydrogenated polymer has less than the theoretic unsaturation due to a small amount of cross-linking and the like, and also because it is undesirable to make use of the extremely drastic hydrogenation conditions required to effect complete saturation of the double bonds present. In some cases hydrogenated polymers containing as much as about 2% of added combined hydrogen may be produced. In general, however, in the case of the rubbery methylpentadiene polymers, which have molecular weights of 50,000 and higher, it is preferred to hydrogenate to an even less degree, producing products having from about 0.1% to about 1% of added combined hydrogen. The lower molecular weight polymers may be advantageously more completely hydrogenated.

For use in safety glass hydrogenated polymethylpentadienes having molecular weights after hydrogenation of about 3,000 or more are preferred. The interlayer may be composed of hydrogenated polymethylpentadienes alone or in admixture with other suitable interlayer materials such as polyvinyl acetals, cellulose acetate, etc. The interlayer may consist of a single layer containing hydrogenated polymer. If desired, one or more layers of other suitable material such as cellulose acetate, polyvinyl butyral, etc. may be used in addition to the hydrogenated polymer interlayer. Adhesives such as gelatin, fish glue, rubber, cellulose nitrate, resins and the like may or may not be employed. Laminated products comprising a layer containing hydrogenated polymethylpentadiene, only one side of which is in adherent contact with a layer of glass, are included, as well as products comprising two sheets of glass separated by and in adherent contact with the interlayer. Instead of glass, other rigid or semi-rigid base materials may be used such as regenerated cellulose, cellulose nitrate, cellulose acetate, cellulose acetate-butyrate, cellulose acetate-propionate, cellulose ethers, polymethyl methacrylate, polydiallyl phthalate, polydiallyl diglycolate, etc. Reinforced laminates which may or may not be transparent may be produced.

The new hydrogenated materials are by no means limited to use as safety glass interlayers. Many of the new products may be used in the production of molded articles. The material may be pulverized or otherwise comminuted and molded by compression, transfer, injection or extrusion techniques. Films, filaments, rods, tubes, and other shapes may be produced by melt or solvent extrusion, by the wet or dry methods. Many shapes, particularly films, may be produced by casting from solution. Massive castings may be made. Sheets may be produced by the use of cold or heated rolls, particularly calender rolls.

The high polymers are valuable as ingredients in coating and impregnating compositions. They may be mixed with various modifying ingredients including solvents and applied to many kinds of surfaces. The addition of oxygen-yielding substances such as peroxides or of siccatives such as are employed in paints may assist in the production of hard, durable films. Baked coatings may be produced.

Many of the hydrogenated polymers having molecular weights below about 30,000 and in some cases the higher polymers may be employed as plasticizers and tackifiers for elastomers and plastics of many kinds. They may be used to improve the out-growth resistance of synthetic rubber, such as GR-S (butadiene/styrene copolymer), etc.

For many purposes, particularly for the production of molding and coating compositions, it may be desirable to modify the new hydrogenated polymers by admixture with one or more other substances. Solvents may be used. The new hydrogenated polymers are outstanding in their ready solubility in many kinds of readily available inexpensive organic solvents. Representative examples of suitable solvents are the following:

Hexane
Pentane
Isooctane
Gasoline
Cyclohexane
Methylcyclohexane
Chloroform
Ethylene dichloride
Trichloroethane
Trichloroethylene
Monochlorobenzene
Monochlorotoluene
Dichloropentanes
Ortho-dichlorobenzene
1,2,3-trichlorobutane
Benzene
Toluene
Benzyl alcohol
Phenyl ethyl alcohol
Dibenzyl ether
Phenyl ethyl ether
Dioxane
Dioxolane
Methyl dioxolane
Methyl "Cellosolve" acetate
Methyl acetate
Ethyl acetate
Isopropyl acetate
Butyl acetate
Ethyl oxalate
Ethyl acetoacetate
Benzyl benzoate
Acetone
Methyl ethyl ketone
Diisopropyl ketone
Methyl isobutyl ketone Other solvents will be readily apparent to those skilled in the art.

Other modifiers include plasticizers, tackifiers, dyes, pigments, fillers, lubricants, stabilizers, drying oils, semi-drying oils, non-drying oils, natural resins, protein plastics, lignin plastics, cellulose derivatives, synthetic polyamides, synthetic polyesters, phenol-aldehyde resins, urea-aldehyde resins, alkyd resins, resinous polymers of compounds containing unsaturated carbon-to-carbon linkages, natural rubber, synthetic rubber and the like.

The completely and partially hydrogenated polymethylpentadienes may be modified by many kinds of physical and chemical treatment, including halogenation, hydrohalogenation, sulfonation, sulfurization, cyclization, etc. Many of the compounds can be vulcanized by heat in the presence of sulfur or other suitable vulcanizing agents.

Some of the many ways in which the invention can be practiced are illustrated by the following examples in which parts are on a weight basis.

*Example I*

A rubbery polymer having a molecular weight of about 200,000 was produced by the polymerization of a mixture of about 85 parts of 2-methyl-1,3-pentadiene with about 15 parts of 4-methyl-1,3-pentadiene in the presence of stannic chloride at a low temperature. 400 parts of the polymer was dissolved in 1126 parts of hot acid octanes. The solution was placed in a large pressure vessel. 262 parts of a catalyst consisting of 1 part of finely divided metallic nickel and 1 part of kieselguhr was dispersed therein. The oxygen in the vessel was displaced by hydrogen. Hydrogen was added until the pressure within the vessel was 2,500 p. s. i. The vessel was then sealed and heated for 48 hours at 240° C. The pressure within the vessel at the end of this time was 1,100 p. s. i. at room temperature. The hydrogenated product was separated from the other ingredients of the reaction mixture and purified in the usual manner. It was found that approximately 73% of the theoretically maximum amount of hydrogen had been absorbed. Some depolymerization may have occurred.

*Example II*

A polymer identical with that used in Example I is partially hydrogenated in accordance with the following procedure. 400 parts of the polymer dissolved in 1126 parts of hot acid octanes is placed in a hydrogenation vessel. 262 parts of active nickel catalyst is added. The oxygen in the vessel is removed and hydrogen added until the pressure within the vessel is 2,500 pounds. The vessel is then sealed and heated for 24 hours at 100 C. The product is isolated and purified in the usual manner. It is found that much smaller amount of hydrogen has been absorbed.

*Example III*

A mixture of 2 parts of alpha-methyl styrene with 98 parts of a mixture containing about 85% of 2-methyl-1,3-pentadiene and about 15% of 4-methyl-1,3-pentadiene was polymerized in solution in liquid ethylene at atmospheric pressure (about −100° C.) in the presence of 2 parts of aluminum chloride. The copolymer was recovered and purified in the usual manner. It was water-white, transparent, tough and elastic. It had a Mooney plasticity of 80 at 60° C.

The copolymer so produced is dissolved in hot acid octanes and hydrogenated over a Raney nickel catalyst at 240° C. under an initial pressure of 2,500 p. s. i.

*Example IV*

Alpha-methyl styrene, 20 parts, was copolymerized with 80 parts of the mixture of methylpentadienes used in Example I in solution in a mixture of liquid isomeric pentanes at about −75° C. under atmospheric pressure in the presence of 3 parts of stannic chloride. The copolymer, having a molecular weight of 75,000 (by viscosity measurements), is hydrogenated in accordance with the procedure of Example II.

*Example V*

Styrene, 10 parts, was copolymerized with 90 parts of the mixture of methylpentadienes used in Example I in solution in liquid ethylene at about −100° C. under atmospheric pressure in the presence of 3 parts of stannic chloride. The product had a molecular weight of 185,000, as determined by viscosity measurements.

The copolymer so obtained is hydrogenated at about 75° C. under an initial hydrogen pressure of 2,500 p. s. i. over Raney nickel.

*Example VI*

A copolymer was produced from a mixture of styrene, 25 parts, with 75 parts of the mixture of methylpentadienes used in Example I. The mixture was emulsified in an aqueous phase consisting of water, 180 parts, Ivory soap, 5.1 parts, and diazoaminobenzene, 1 part. The emulsion was held at 90° C. for 16 hours. The copolymer product is hydrogenated in accordance with Example I.

*Example VII*

90 parts of the mixture of methylpentadienes employed in Example I and 10 parts of butadiene, together with 1 part of diazoaminobenzene as catalyst, were emulsified in a mixture of water, 180 parts, containing "Ivory" soap, 5.1 parts, as emulsifying agent, and "Daxad #11" as protective colloid. Polymerization was effected at 90° for 16 hours. The resulting copolymer is hydrogenated in accordance with Example I.

*Example VIII*

A copolymer was prepared from 90 parts of a mixture of the methylpentadienes employed in Example I and 10 parts of isoprene in accordance with the procedure of Example VII. Hydrogenation of the product is effected in accordance with Example I.

*Example IX*

A viscous liquid linear polymer is produced by treating a mixture of the methylpentadienes employed in Example I with a solution of stannic chloride in ethyl chloride, the temperature of the reaction mixture being held at between 10° C. and 20° C. The liquid polymer is hydrogenated in accordance with Example I. The hydrogenated polymer may be employed as a textile assistant (lubricant) and as a compounding ingredient in butadiene/styrene copolymers and in synthetic rubbers comprising linear high copolymers of 2-methyl-1,3-pentadiene with 4-methyl-1,3-pentadiene.

The term "unsaturated," as used herein, refers to carbon-to-carbon unsaturation. The term "polymerization" refers to polymerization through carbon-to-carbon unsaturation with accompanying reduction in unsaturation.

We claim as our invention:

1. A clear, transparent hydrogenation product of a linear polymer of (1) 90 parts of a mixture of 85% 2-methyl-1,3-pentadiene and 15% 4-methyl-1,3-pentadiene and (2) 10 parts of styrene capable of adhering to many kinds of transparent base materials, said linear copolymer having a molecular weight of about 185,000.

2. A clear, transparent hydrogenation product of a linear copolymer of (1) 90 parts of a mixture of 85% 2-methyl-1,3-pentadiene and 15% 4-methyl-1,3-pentadiene and (2) 10 parts of 1,3-butadiene, said linear copolymer having a molecular weight of between 50,000 and 500,000.

3. A clear, transparent hydrogenation product of a linear copolymer of a mixture of 85 parts of 2-methyl-1,3-pentadiene and 15 parts of 4-methyl-1,3-pentadiene, said polymer having a molecular weight between 50,000 and 500,000.

4. A clear, transparent hydrogenation product of a linear copolymer of (1) a mixture of 85% 2-methyl-1,3-pentadiene and 15% 4-methyl-1,3-pentadiene with (2) not more than 25% of a compound selected from the group consisting of styrene, alpha-methyl styrene, dichlorostyrene, and 1,3-butadiene, said copolymer having a molecular weight between 50,000 and 500,000.

RUPERT C. MORRIS.
JOHN L. VAN WINKLE.

REFERENCES CITED

The following references are of record in the file of this patent:

UNITED STATES PATENTS

| Number | Name | Date |
|---|---|---|
| 1,039,741 | Hofmann | Oct. 1, 1912 |
| 1,062,913 | Hofmann | May 27, 1913 |
| 1,074,432 | Hofmann | Sept. 30, 1913 |
| 1,898,522 | Bock | Feb. 21, 1933 |
| 2,046,257 | Flint | June 30, 1936 |
| 2,093,096 | Pier | Sept. 14, 1937 |
| 2,094,576 | Arveson | Oct. 5, 1937 |

OTHER REFERENCES

Bachman and Gaebel, J. Am. Chem. Soc., 64, 787–9, Apr. 1942.